United States Patent
Seo et al.

(10) Patent No.: US 10,862,668 B2
(45) Date of Patent: Dec. 8, 2020

(54) METHOD AND APPARATUS FOR SYNCHRONIZATION OF COMMUNICATION NODES USING MULTIPLE DOMAINS IN VEHICLE NETWORK

(71) Applicants: Hyundai Motor Company, Seoul (KR); Kia Motors Corporation, Seoul (KR)

(72) Inventors: Kang Woon Seo, Seoul (KR); Dong Ok Kim, Goyang-si (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 24 days.

(21) Appl. No.: 16/452,060

(22) Filed: Jun. 25, 2019

(65) Prior Publication Data

US 2019/0394017 A1    Dec. 26, 2019

(30) Foreign Application Priority Data

Jun. 26, 2018    (KR) .................. 10-2018-0073649

(51) Int. Cl.
*H04W 52/00*    (2009.01)
*H04L 7/04*    (2006.01)
*H04L 29/08*    (2006.01)

(52) U.S. Cl.
CPC ............. *H04L 7/04* (2013.01); *H04L 67/12* (2013.01)

(58) Field of Classification Search
CPC .................................. H04L 7/04; H04L 67/12
USPC ........................................................ 370/503
See application file for complete search history.

(56) References Cited

U.S. PATENT DOCUMENTS

2019/0045246 A1*    2/2019    Ghangam .......... H04N 21/6332
2019/0245690 A1*    8/2019    Shah ..................... H04L 63/123

\* cited by examiner

*Primary Examiner* — Sai Ming Chan
(74) *Attorney, Agent, or Firm* — Morgan, Lewis & Bockius LLP

(57) ABSTRACT

An operation method of a first communication node operating as a current reference grand master (GM) node in a vehicle network may comprise: transmitting a first synchronization message including a first reference time of the first communication node; receiving a first response message from a second communication node, the first response message including a first synchronization offset indicating a difference between a first local time of the second communication node and the first reference time; receiving a second response message from the second communication node, the second response message including a second synchronization offset indicating a difference between the first local time and a second reference time of a third communication node operating as a GM node; and determining the first communication node or the third communication node as a first reference GM node based on a result of comparison between the first synchronization offset and the second synchronization offset.

20 Claims, 7 Drawing Sheets

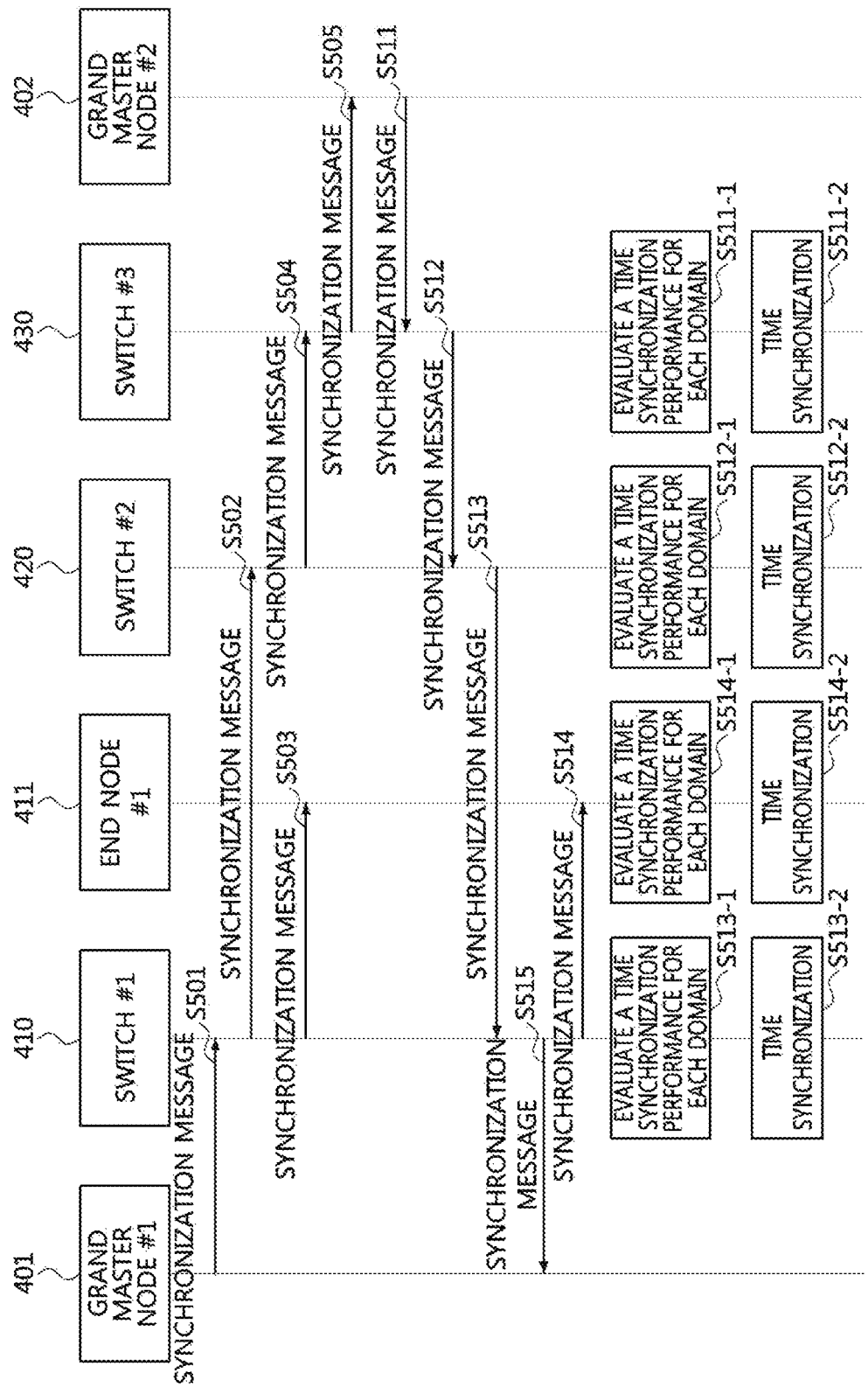

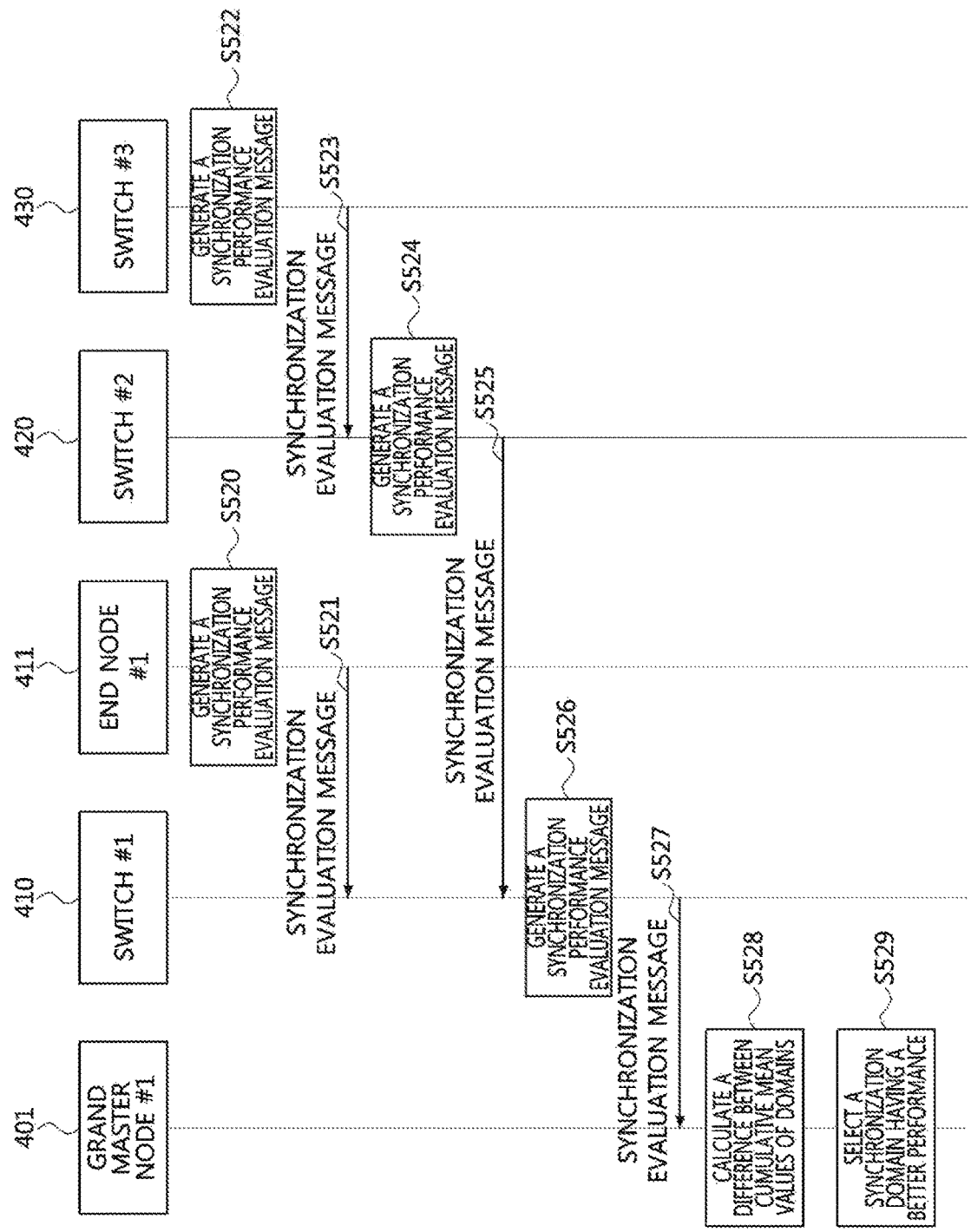

METHOD AND APPARATUS FOR SYNCHRONIZATION OF COMMUNICATION NODES USING MULTIPLE DOMAINS IN VEHICLE NETWORK

CROSS-REFERENCE TO RELATED APPLICATION

This application claims the benefit of priority to Korean Patent Application No. 10-2018-0073649, filed on Jun. 26, 2018 in the Korean Intellectual Property Office (KIPO), the entirety of which is incorporated by reference as if fully set forth herein.

TECHNICAL FIELD

The present disclosure relates to vehicle network technology, and more specifically, to a method and an apparatus for enhancing performance of synchronization among communication nodes by simultaneously operating multiple time domains.

BACKGROUND

The number and variety of devices installed in vehicles have increased significantly in accordance with the recent digitalization of vehicle parts. Generally, electronic devices may be used throughout the vehicles, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Most enhanced safety systems of a vehicle, such as telematics systems and infotainment systems, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The Institute of Electrical and Electronics Engineers (IEEE) 802.1AS provides an algorithm that enables network time synchronization based on a reference time of a node selected as a grand master. The grand master node may transmit information on its own time to other communication nodes in a network by transmitting a synchronization message including the information, communication nodes other than the grand master node may identify the reference time of the grand master node based on the synchronization message, and the other communication nodes may be synchronized to the grand master node. However, there may be a difference between a local time of each of the other communication nodes and the reference time of the grand master node until synchronization is performed for them. Thus, when strict time synchronization is required, smooth communications may not be performed due to the difference between the reference time of the grand master node and the local time.

SUMMARY

The present disclosure provides a method and an apparatus for performing synchronization among communication nodes by simultaneously operating a plurality of time domains in a vehicle network.

In accordance with an exemplary embodiment of the present disclosure, an operation method of a first communication node operating as a current grand master (GM) node in a vehicle network may comprise: transmitting a first synchronization message including a first reference time of the first communication node; receiving a first response message from a second communication node, the first response message including a first synchronization offset indicating a difference between a first local time of the second communication node and the first reference time; receiving a second response message from the second communication node, the second response message including a second synchronization offset indicating a difference between the first local time and a second reference time of a third communication node operating as a GM node; comparing the first synchronization offset and the second synchronization offset; determining the first communication node or the third communication node as a first new reference GM node based on a result of comparison between the first synchronization offset and the second synchronization offset; and transmitting a second synchronization message including information on the first reference time of the first communication node and information on the first new reference GM node, wherein the second synchronization message includes an indicator indicating a format of the second synchronization message, and the indicator indicates that the second synchronization message includes the information on the first new reference GM node.

The first communication node and the third communication node may have different time domains.

The first synchronization message may further include an indicator indicating a format of the first synchronization message, and the indicator may indicate that the information on the determined new reference GM node is not included in the first synchronization message.

When the second communication node is a switch, a fourth communication node is an end node connected to the first communication node through the second communication node, and the first response message further includes a third synchronization offset indicating a difference between the first reference time and a second local time of the fourth communication node, the new reference GM node may be determined based on a result of comparison among the first synchronization offset, the second synchronization offset, and the third synchronization offset.

The second response message may further include a fourth synchronization offset indicating a difference between the second reference time and the second local time of the fourth communication node, and the new reference GM node may be determined based on a result of comparison among the first synchronization offset, the second synchronization offset, the third synchronization offset, and the fourth synchronization offset.

The second synchronization message may be a Sync message, and a reserved field of the Sync message may indicate an identifier of the determined new reference GM node.

In accordance with another exemplary embodiment of the present disclosure, an operation method of a switch in a vehicle network may comprise receiving a first synchronization message from a first grand master (GM) node, the first synchronization message including a first reference time of the first GM node; calculating a first synchronization offset indicating a difference between the first reference time and a first local time of the switch; receiving a first response message from an end node, the first response message including a second synchronization offset indicating a difference between a second local time of the end node and the first reference time; transmitting a second response message to the first GM node, the second response message including the first synchronization offset and the second synchronization offset; receiving a second synchronization message from the first GM node, the second synchronization message including information on a first reference GM node determined based on the first response message and the second response message; and synchronizing the switch based on the second synchronization message.

When the determined reference GM node is the first GM node, the switch may be synchronized to the first reference time of the first GM node.

The operation method may further comprise, before the synchronizing, receiving a third synchronization message from a second GM node, the third synchronization message including a second reference time of the second GM node; calculating a third synchronization offset indicating a difference between the second reference time and the first local time of the switch; receiving a third response message from the end node, the third response message including a fourth synchronization offset indicating a difference between the second local time of the end node and the second reference time; transmitting a fourth response message to the second GM node, the fourth response message including the third synchronization offset and the fourth synchronization offset; and receiving a fourth synchronization message from the first GM node, the fourth synchronization message including information on a reference GM node determined based on based on the third response message and the fourth response message, wherein, in the synchronizing, the switch may be synchronized to the second reference time of the second GM node when the determined reference GM node is the second GM node.

The first GM node and the second GM node may have different time domains.

The first synchronization message may further include an indicator indicating a format of the first synchronization message, and the indicator may indicate that the information on the determined reference GM node is not included in the first synchronization message.

The second synchronization message may further include an indicator indicating a format of the second synchronization message, and the indicator may indicate that the information on the determined reference GM node is included in the second synchronization message.

The second synchronization message may be a Sync message, and a reserved field of the Sync message may indicate an identifier of the determined reference GM node.

In accordance with still another embodiment of the present disclosure, an operation method of an end node in a vehicle network may comprise receiving a first synchronization message including a first reference time of a first GM node; calculating a first synchronization offset indicating a difference between a first local time of the end node and the first reference time; transmitting a first response message including the first synchronization offset; receiving a second synchronization message of the first GM node from the switch, the second synchronization message including information on a reference GM node determined based on the first response message; and synchronizing the switch based on the second synchronization message.

When the determined reference GM node is the first GM node, the end node may be synchronized to the first reference time of the first GM node.

The operation method may further comprise, before the synchronizing, receiving a third synchronization message including a second reference time of a second GM node; calculating a fourth synchronization offset indicating a difference between the second reference time and the first local time of the end node; transmitting a second response message including the fourth synchronization offset; and receiving a fourth synchronization message of the second GM node from the switch, the fourth synchronization message including information on a reference GM node determined based on the second response message, wherein, in the synchronizing, the end node may be synchronized to the second reference time of the second GM node when the determined reference GM node is the second GM node.

The first GM node and the second GM node may have different time domains.

The first synchronization message may further include an indicator indicating a format of the first synchronization message, and the indicator may indicate that the information on the determined reference GM node is not included in the first synchronization message.

The second synchronization message may further include an indicator indicating a format of the second synchronization message, and the indicator may indicate that the information on the determined reference GM node is included in the second synchronization message.

The second synchronization message may be a Sync message, and a reserved field of the Sync message may indicate an identifier of the determined new reference GM node.

According to the exemplary embodiments of the present disclosure, a plurality of grand master nodes may be included in a vehicle network. That is, a plurality of time synchronization domains may exist in the vehicle network. The communication nodes in the vehicle network may receive time synchronization messages from the plurality of grand master nodes. Each of the communication nodes may determine a difference between its local time and a domain-specific synchronization reference time for each domain, and may transmit information on the determined difference to the grand master node.

Each grand master node may have a different time synchronization domain and may transmit a time synchronization message based thereon. Each grand master node may receive information on a difference between a domain-specific synchronization reference time and a local time from each of communication nodes included in the vehicle network. The grand master node may select a synchronization domain based on a performance evaluation result. The grand master node may transmit a synchronization message including information on the selected synchronization domain. The communication nodes may perform synchronization according to the domain selected by the grand master node, which is indicated by the synchronization message. Since synchronization can be performed in the domain having the better synchronization performance, the accuracy of time synchronization can be enhanced. Accordingly, the performance of the vehicle network can be improved.

BRIEF DESCRIPTION OF DRAWINGS

Exemplary embodiments of the present disclosure will become more apparent by describing in detail forms of the present disclosure with reference to the accompanying drawings, in which:

FIG. 5A is a sequence chart illustrating a first exemplary embodiment of an operation method of a communication node in the vehicle network of FIG. 4;

FIG. 5B is a sequence chart illustrating a second exemplary embodiment of an operation method of a communication node in the vehicle network of FIG. 4;

Figure 1:
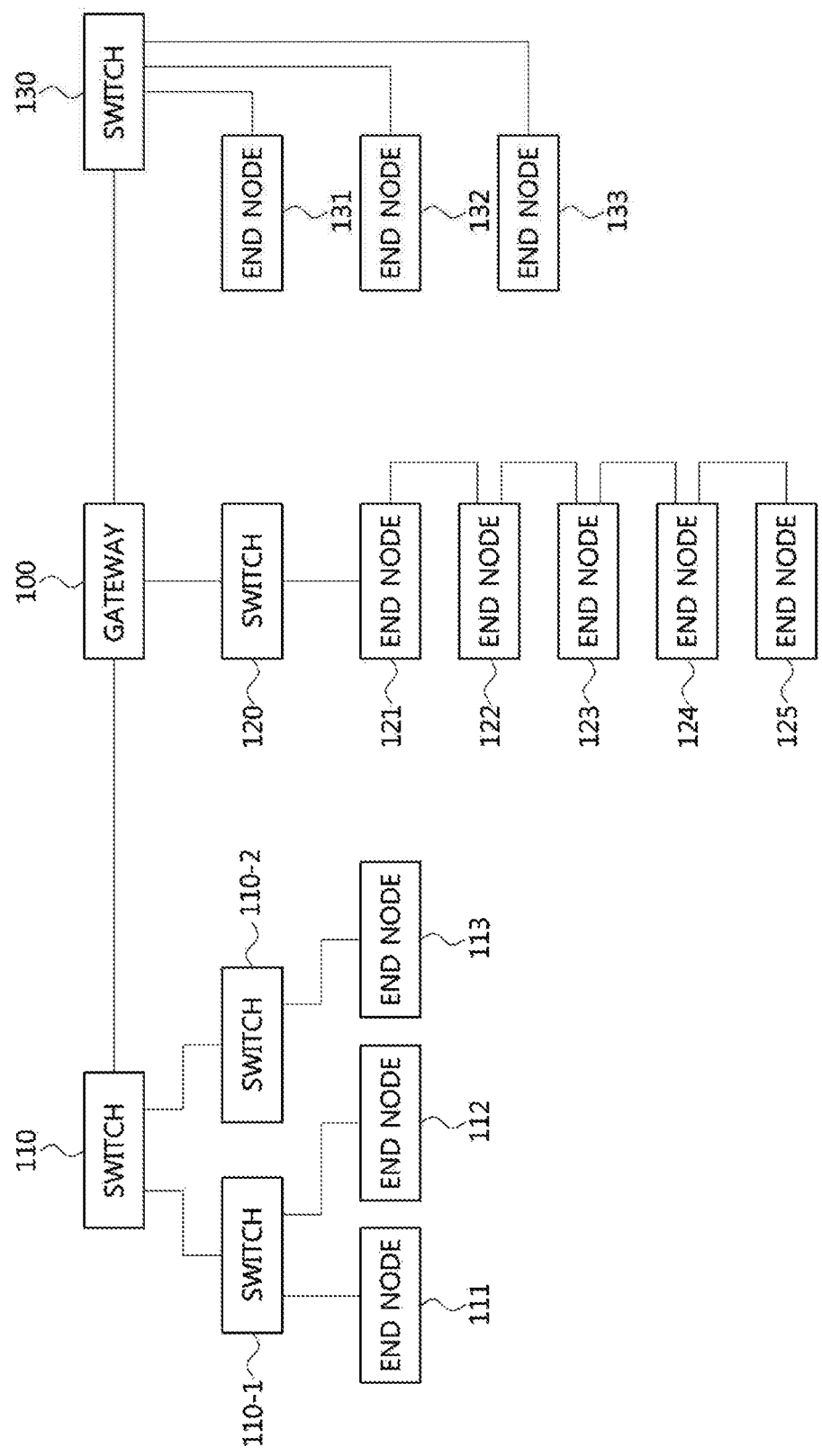
FIG. 1 is a block diagram illustrating a first exemplary embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, exemplary embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/controller unit/control unit may perform one or more of the processes described further below, and the term controller/controller unit/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first exemplary embodiment of a vehicle network topology.

As shown in FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 124, 125, 131, 132, and 133. Each of the switches 110, 110-1, 110-2, 120, and 130 may interconnect the end nodes 111, 112, 113, 121, 122, 123, 124, 125, 131, 132, and 133, and control at least one of the end nodes 111, 112, 113, 121, 122, 123, 124, 125, 131, 132, and 133 connected to the switch.

Each of the end nodes 111, 112, 113, 121, 122, 123, 124, 125, 131, 132, and 133 may include an electronic control unit (ECU) configured to control various types of devices mounted within a vehicle. For example, each of the end nodes 111, 112, 113, 121, 122, 123, 124, 125, 131, 132, and 133 may include an ECU included in an infotainment device (e.g., a display device, a navigation device, and an around view monitoring device).

The communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
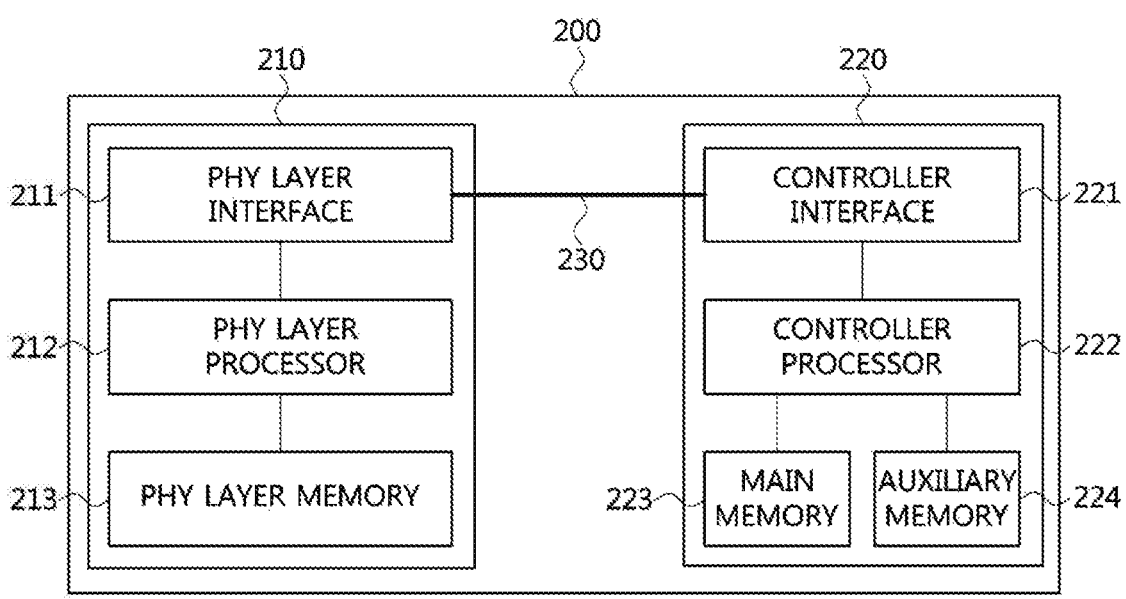
FIG. 2 is a block diagram illustrating a first exemplary embodiment of a communication node belonging to a vehicle network.

FIG. 2 is a block diagram illustrating a first exemplary embodiment of a communication node belonging to a vehicle network.

As shown in FIG. 2, a communication node 200 constituting a vehicle network may include a physical (PHY) layer unit 210 and a controller unit 220. The communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer unit 210 and perform various functions (e.g., an infotainment function, or the like.). The PHY layer unit 210 and the controller unit 220 may be implemented as one system on chip (SoC), or alternatively may be implemented as separate chips.

The PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer unit 210 may include a PHY layer interface 211, a PHY layer processor 212, and a PHY layer memory 213. The configuration of the PHY layer unit 210 is not limited thereto, and the PHY layer unit 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface 221, a controller processor 222, a main memory 223, and an auxiliary memory 224. The controller processor 222 is an electric circuitry which performs various functions described below. The configuration of the controller unit 220 is not limited thereto, and the controller 220 may be configured in various ways. The controller interface 221 may be configured to receive a signal from the PHY layer unit 210 (e.g., the PHY layer interface 211) or an upper layer (not shown), transmit the received signal to the controller processor 222, and transmit the signal received from the controller processor 222 to the PHY layer unit 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Hereinafter, a method performed at a communication node belonging to a vehicle network and a corresponding counterpart communication node will be described. Even when a method (e.g., transmission or reception of a signal) to be performed at a first communication node is described, a corresponding second communication node may perform a method (e.g., reception or transmission of the signal) corresponding to the method performed at the first communication node. That is, when an operation of the first communication node is described, the corresponding second communication node may perform an operation corresponding to the operation of the first communication node. Conversely, when an operation of the second communication node is described, the corresponding first communication node may perform an operation corresponding to the operation of the second communication node.

Figure 3:
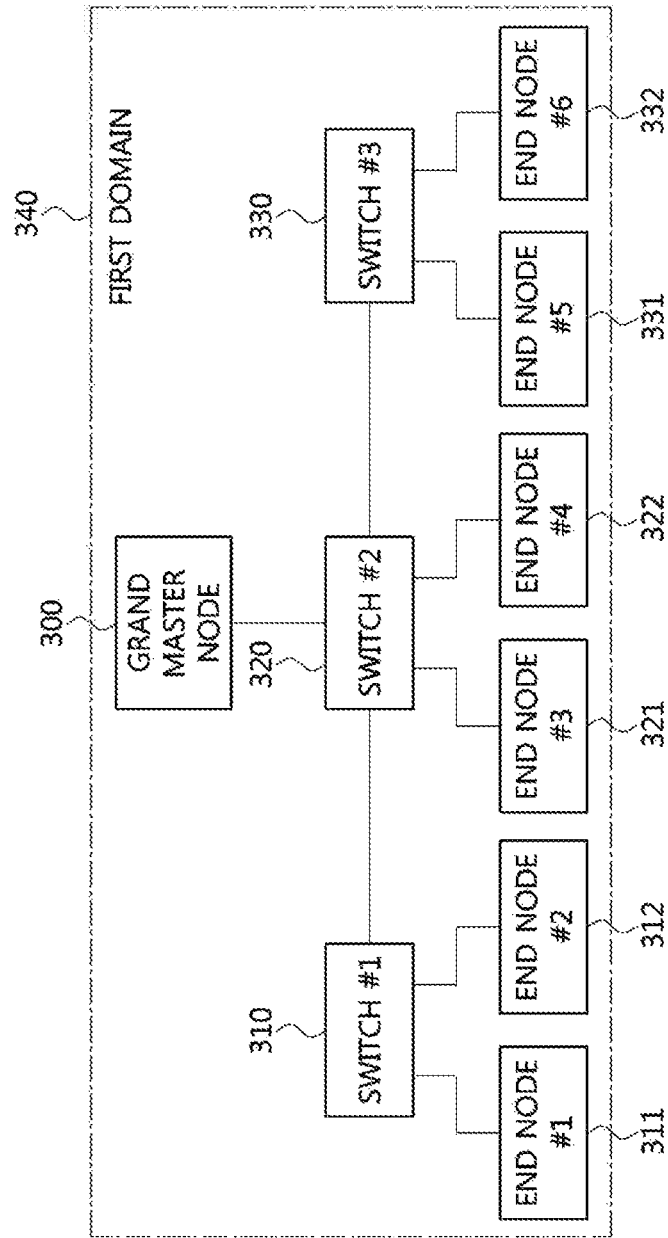
FIG. 3 is a conceptual diagram illustrating a first exemplary embodiment of a vehicle network.

FIG. 3 is a conceptual diagram illustrating a first exemplary embodiment of a vehicle network.

As shown in FIG. 3, a vehicle network may comprise a grand master node 300, a plurality of switches 310, 320 and 330, end nodes 311 and 312 connected to the first switch 310, end nodes 321 and 322 connected to the second switch 320, and end nodes 331 and 332 connected to the third switch 330. Each of the grand master node 300, the plurality of switches 310, 320 and 330, and the end nodes 311, 312, 321, 322, 331, and 332 may have a structure identical to or similar to that of the communication node 200 described with reference to FIG. 2.

The grand master node 300 may be connected to the second switch 320. The second switch 320 may be connected to the grand master node 300, the first switch 310, the third switch 330, the end node 321, and the end node 322. The first switch 310 may be connected to the second switch 320, the end node 311, and the end node 312. The third switch 330 may be connected to the second switch 320, the end node 331, and the end node 332.

In a first synchronization domain (hereinafter, may be referred to simply as 'domain') 340, the grand master (GM) node 300 may be the highest level communication node. The GM node 300 may support a global positioning system (GPS). For example, the GM node 300 may identify an absolute time (i.e., reference time) by using the GPS, and may announce the identified absolute time to communication nodes belonging to the first domain 340. The communication nodes belonging to the first domain 340 may operate based on the reference time of the GM node 300. For example, the time of the communication nodes 310, 311, 312, 320, 321, 322, 330, 331, and 332 belonging to the first domain 340 may be synchronized to the reference time of the GM node 300. A vehicle network having multiple domains may be configured as follows.

Figure 4:
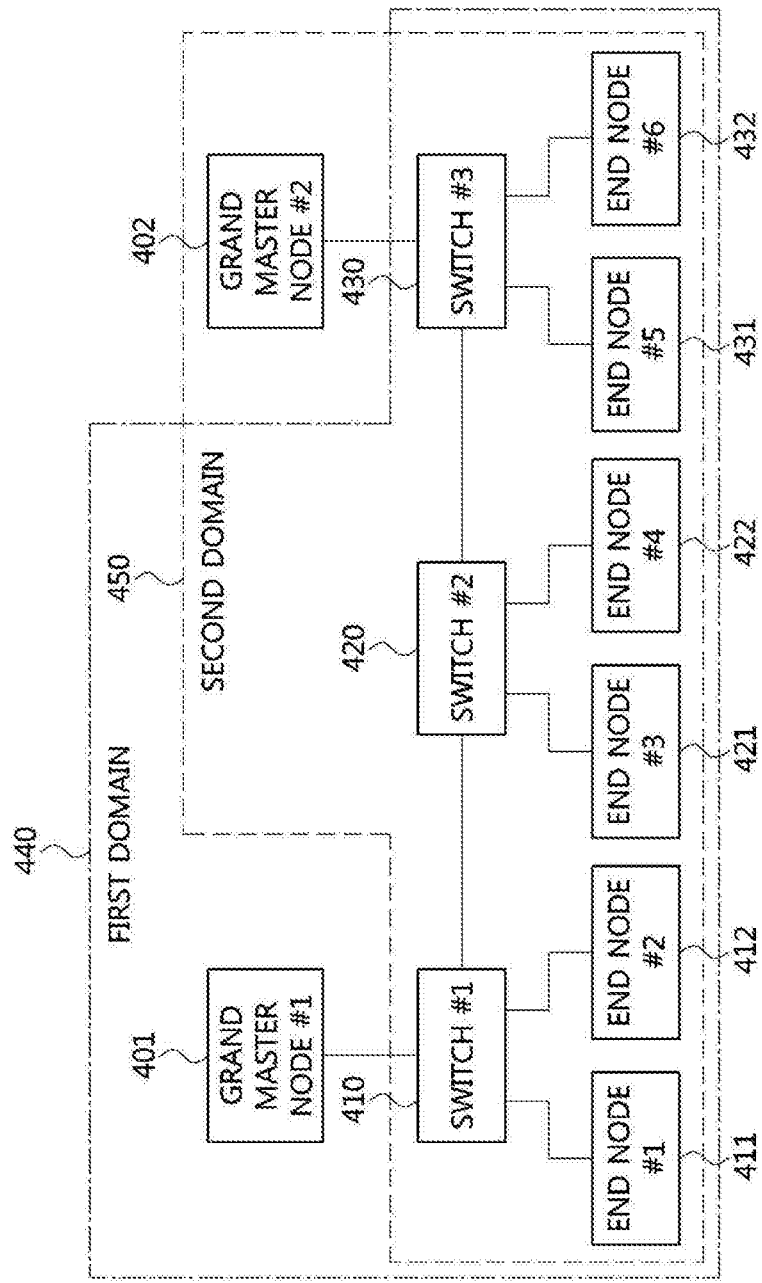
FIG. 4 is a conceptual diagram illustrating a second exemplary embodiment of a vehicle network.

FIG. 4 is a conceptual diagram illustrating a second exemplary embodiment of a vehicle network.

As shown in FIG. 4, a vehicle network may support the IEEE 802.1AS-rev (e.g., generalized precision time protocol (gPTP), etc.), and may comprise a first domain 440 and a second domain 450. The first domain 440 may be referred to as a primary domain and the second domain 450 may be referred to as a sub domain (or, secondary domain). Here, gPTP operations and time scale values may be independent in the respective domains. Each of the domains belonging to the vehicle network may have a unique number (e.g., an identifier). The range of the unique number may be from 0 to 127. However, the range of the unique number may not be limited thereto, and the range of the unique number may exceed 127. In an industrial system, a unique number of a universal time domain may be set to 0, and a unique number of a working clock domain may be set to one of 1 to 127. In the industrial system, the domain may referrer to a country, a city, a specific area belonging to a city, or the like.

Each of the first domain 440 and the second domain 450 may include a plurality of communication nodes. There may be communication nodes belonging to both the first domain 440 and the second domain 450. Each of the communication nodes may be a GM node, a switch (or bridge), an end node, or the like. The communication nodes may be physically connected to each other.

In the first domain 440, a first GM node 401 may be the highest level communication node. The grand master node 401 may support a GPS. For example, the GM node 401 may identify an absolute time (i.e., first reference time) by using the GPS, and may announce the identified absolute time to communication nodes belonging to the first domain 440. The communication nodes belonging to the first domain 440 may operate based on the reference time of the GM node 401. For example, the time of the communication nodes belonging to the first domain 440 may be synchronized to the reference time of the GM node 401.

In the first domain 440, the GM node 401 may be connected to a first switch 410. The first switch 410 may be connected to the GM node 401, a second switch 420, and end nodes 411 and 412. The second switch 420 may be connected to the first switch 410, a third switch 430, and end nodes 421 and 422. The third switch 430 may be connected to the second switch 420, and end nodes 431 and 432. Another end node (not shown and referred to as 'seventh end node') may be directly connected to the GM node 401.

In the second domain 450, a second GM node 402 may be the highest level communication node. The reference time of the second domain 450 may be configured based on a local oscillator. The communication nodes belonging to the second domain 450 may operate based on the reference time of the GM node 402. For example, the time of the communication nodes belonging to the second domain 450 may be synchronized to the reference time of the GM node 402.

In the second domain 450, the GM node 402 may be connected to the third switch 430. The third switch 430 may be connected to the GM node 402, the second switch 420, and the end nodes 431 and 432. The second switch 420 may be connected to the first switch 410, the third switch 430, and the end nodes 421 and 422. The first switch 410 may be connected to the second switch 420, and the end nodes 411 and 412. Another end node (not shown and referred to as 'seventh end node') may be directly connected to the GM node 402.

The configuration of the vehicle network is not limited to those described above, and the vehicle network may be configured in various ways. The number of communication nodes operating as the GM node is not limited to two, and it is also possible that there are three or more GM nodes and three or more time domains. Next, a synchronization method utilizing multiple domains in a vehicle network will be described.

FIG. 5A is a sequence chart illustrating a first exemplary embodiment of an operation method of a communication node in the vehicle network of FIG. 4.

As shown in FIGS. 4 and 5A, a vehicle network of FIG. 5A may be the same as or similar to the vehicle network of FIG. 4. A first GM node 401 of FIG. 5A may be the GM node 401 of FIG. 4, and a second GM node 402 of FIG. 5A may be the GM node 402 of FIG. 4. A first switch 410 of FIG. 5A may be the first switch 410 of FIG. 4, a second switch 420 of FIG. 5A may be the second switch 420 of FIG. 4, a third switch 430 of FIG. 5A may be the third switch 430 of FIG. 4. An end node 411 of FIG. 5A may be the end node 411 of FIG. 4.

The communication nodes may support the IEEE 802.1AS-rev. The GM node 401 may belong to the first domain 440 and the GM node 402 may belong to the second domain 450, and the switches 410, 420 and 430 and the end nodes 411, 412, 421, 422, 431 and 432 may belong to both the first domain 440 and the second domain 450. The switches 410, 420 and 430 and the end nodes 411, 412, 421, 422, 431 and 432 may operate as slave nodes. Each of the slave nodes 410, 411, 412, 420, 421, 422, 430, 431 and 432 may be synchronized to one of the GM node 401 and the GM node 402, which operates as a reference GM node. For example, the GM node 401 may be a reference GM node, and the slave nodes 410, 411, 412, 420, 421, 422, 430, 431 and 432 may be synchronized with a first reference time of the GM node 401.

The GM node 401 may transmit a synchronization message including the first reference time of the GM node 401 to the first switch 410 (S501). A header of the synchronization message may include an indicator (hereinafter referred to as a 'reference indicator') indicating whether or not reference domain information is included. For example, when the reference indicator is set to 1, the synchronization message may include the reference domain information and the reference time (i.e., the first reference time), and when the reference indicator is set to 0, the synchronization message may include only the reference time.

The reference indicator of the synchronization message transmitted from the GM node 401 to the first switch 410 may be set to 0, since the reference domain is not yet selected. Upon receiving the synchronization message, the communication nodes 410, 411, 420, and 430 may identify a format of the synchronization message based on the reference indicator included in the header of the synchronization message. When the reference indicator of the synchronization message is set to 0, the communication nodes 410, 411, 420, and 430 may determine that the synchronization message includes only the reference time without including the reference domain information.

The first switch 410 may receive the synchronization message of the GM node 401 from the GM node 401, and transmit the received synchronization message of the GM node 401 to the second switch 420 (S502). The first switch 410 may transmit the received synchronization message of the GM node 401 to the end node 411 (S503). The end node 411 may receive the synchronization message of the GM node 401 from the first switch 410. The second switch 420 may receive the synchronization message of the GM node 401 from the first switch 410, and transmit the received synchronization message of the GM node 401 to the third switch 430 (S504). The third switch 430 may receive the synchronization message of the GM node 401 from the second switch 420, and transmit the received synchronization message of the GM node 401 to the GM node 402 (S505). The GM node 402 may receive the synchronization message of the GM node 401.

The GM node 402 may transmit a synchronization message including a second reference time of the GM node 402 to the third switch 430 (S511). Since the reference domain is not yet selected, the reference indicator of the synchronization message transmitted by the GM node 402 to the third switch 430 may be set to 0.

The third switch 430 may receive the synchronization message of the GM node 402 from the GM node 402, and transmit the received synchronization message of the GM node 402 to the second switch 420 (S512). The second switch 420 may receive the synchronization message of the GM node 402 from the third switch 430, and transmit the received synchronization message of the GM node 402 to the first switch 410 (S513). The first switch 410 may receive the synchronization message of the GM node 402 from the second switch 420, transmit the received synchronization message of the GM node 402 to the end node 411 (S514), and transmit the received synchronization message of the GM node 402 to the GM node 401. The end node 411 may receive the synchronization message of the GM node 402 from the first switch 410, and the GM node 401 may receive the synchronization message of the GM node 402 from the first switch 410 (S515).

The third switch 430 may identify the first reference time of the GM node 401 included in the synchronization message of the GM node 401 received from the second switch 420. The third switch 430 may compare the first reference time of the GM node 401 with a local time (hereinafter, referred to as 'third local time') of the third switch 430. The third switch 430 may calculate a difference between the first reference time of the GM node 401 and the third local time of the third switch 430, and may record the difference (S511-1). The difference between the first reference time and the third local time may be a propagation delay between the GM node 401 and the third switch 430. Each time the third switch 430 receives the synchronization message from the GM node 401, the third switch 430 may calculate a cumulative mean value of the differences between the first reference time of the GM node 401 and the third local time of the third switch 430, and record the calculated cumulative mean value. The cumulative mean value of the differences may be calculated as Equation 1 below.

$$V_{mean} = (V_n + V_{n-1} + \ldots + V_{n-m})/(m+1) \qquad \text{[Equation 1]}$$

$V_n$: n-th difference value

Figure 6:
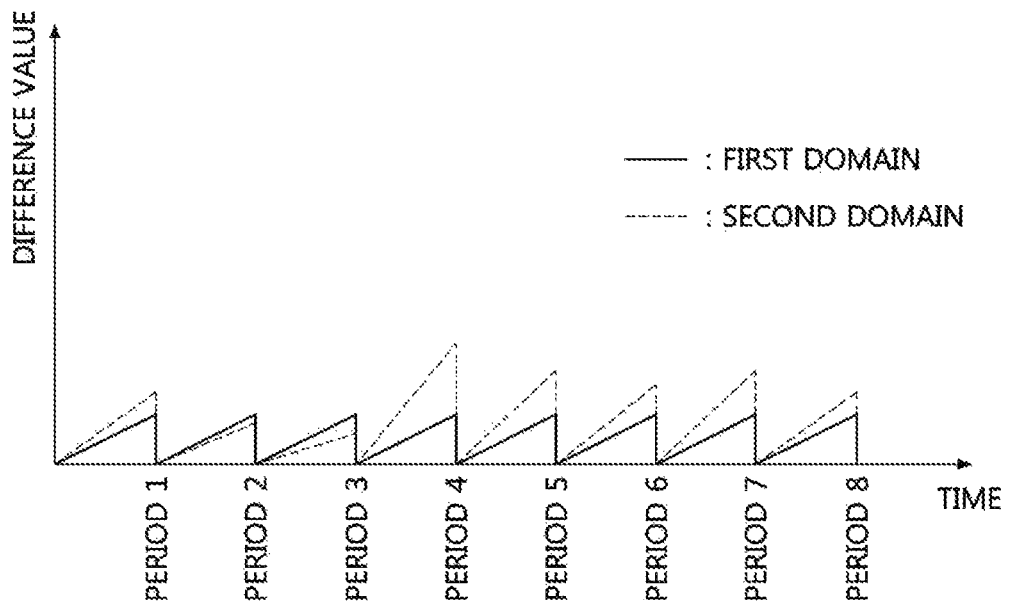
FIG. 6 is a graph illustrating a difference in synchronization time for each domain in a communication node constituting a vehicle network.

FIG. 6 is a graph illustrating a difference in synchronization time for each domain in a communication node constituting a vehicle network.

As shown in FIG. 6, a difference value may mean a difference value between the reference time value of the GM node and the local time of the communication node, which is calculated by the communication node receiving the synchronization message. The solid line may indicate the difference value between the reference time of the GM node 401 and the local time of the communication node in the first domain, and the dotted line may indicate the difference value between the reference time of the GM node 402 and the local time of the communication node in the second domain. Synchronization may be performed every synchronization period, and, at the time when the synchronization is acquired, the difference between the reference time of the GM node and the local time of the communication node may be eliminated, and the difference value may be increased until the next synchronization. The difference value between the reference time of the GM node and the local time of the communication node may be calculated for each domain every synchronization period, and it may be determined that the synchronization performance of the GM node belonging to the domain having the smaller difference value is better. The difference value may be a variance value of the local time of the communication node with respect to the reference time of the GM node.

Referring back to FIG. 5A, a time difference value between the third local time of the third switch 430 and the first reference time of the GM node 401 may be a variance value of the third local time of the third switch 430 with respect to the first reference time of the GM node 401. The third switch 430 may identify the format of the synchronization message based on the reference indicator (i.e., 0) included in the synchronization message. When the reference indicator is 0, the third switch 430 may not perform synchronization. Alternatively, when the reference indicator is 0, the third switch 430 may be synchronized to the first reference time of the GM node 401.

The third switch 430 may identify a second reference time of the GM node 402, which is included in the synchronization message of the GM node 402 received from the GM node 402. The third switch 430 may compare the second reference time of the GM node 402 with the third local time of the third switch 430. The third switch 430 may calculate a difference between the second reference time of the GM node 402 and the third local time of the third switch 430, and record the difference therebetween (S511-1). Each time the third switch 430 receives the synchronization message from the GM node 402, the third switch 430 may calculate a cumulative mean value of the differences between the second reference time of the GM node 402 and the third local time of the third switch 430, and record the calculated cumulative mean value.

The difference value between the third local time of the third switch 430 and the second reference time of the GM node 402 may be a variance value of the third local time of the third switch 430 with respect to the second reference time of the GM node 430. When the reference indicator is 0, the third switch 430 may not perform synchronization. Alternatively, when the reference indicator is 0, the third switch 430 may be synchronized to the second reference time of the GM node 402.

The second switch 420 may identify the first reference time of the GM node 401, which is included in the synchronization message of the GM node 401 received from the first switch 410. The second switch 420 may compare the first reference time of the GM node 401 with a local time (hereinafter, referred to as 'second local time') of the second switch 420. The second switch 420 may calculate a difference between the first reference time of the GM node 401 and the second local time of the second switch 420, and record the difference therebetween (S512-1). The difference between the first reference time and the second local time may be a propagation delay between the GM node 401 and the second switch 420. Each time the second switch 420 receives the synchronization message from the GM node 401, the second switch 420 may calculate a cumulative mean value of the differences between the first reference time of the GM node 401 and the second local time of the second switch 420, and record the calculated cumulative mean value.

The difference value between the second local time of the second switch 420 and the first reference time of the GM node 401 may be a variance value of the second local time of the second switch 420 with respect to the first reference time of the GM node 401. When the reference indicator is 0, the second switch 420 may not perform synchronization. Alternatively, when the reference indicator is 0, the second switch 420 may be synchronized to the first reference time of the GM node 401.

The second switch 420 may identify the second reference time of the GM node 402, which is included in the synchronization message of the GM node 402 received from the third switch 430. The second switch 420 may compare the second reference time of the GM node 402 with the second local time of the second switch 420. The second switch 420 may calculate a difference between the second reference time of the GM node 402 and the second local time of the second switch 420, and record the difference therebetween (S512-1). Each time the second switch 420 receives the synchronization message from the GM node 402, the second switch 430 may calculate a cumulative mean value of the differences between the second reference time of the GM node 402 and the second local time of the second switch 420, and record the calculated cumulative mean value.

The difference value between the second local time of the second switch 430 and the first reference time of the GM node 401 may be a variance value of the second local time of the second switch 420 with respect to the second reference time of the GM node 402. When the reference indicator is 0, the second switch 420 may not perform synchronization. Alternatively, when the reference indicator is 0, the second switch 430 may be synchronized to the second reference time of the GM node 402.

The first switch 410 may identify the first reference time of the GM node 401, which is included in the synchronization message of the GM node 401 received from the GM node 401. The first switch 410 may compare the first reference time of the GM node 401 with a local time (hereinafter, referred to as 'first local time') of the first switch 410. The first switch 410 may calculate a difference between the first reference time of the GM node 401 and the first local time of the first switch 410, and record the difference therebetween (S513-1). The difference between the first reference time and the first local time may be a propagation delay between the GM node 401 and the first switch 410. Each time the first switch 410 receives the synchronization message from the GM node 401, the first switch 410 may calculate a cumulative mean value of the differences between the first reference time of the GM node 401 and the first local time of the first switch 410, and record the calculated cumulative mean value.

The difference value between the first local time of the first switch 410 and the first reference time of the GM node 401 may be a variance value of the first local time of the first switch 410 with respect to the first reference time of the GM node 401. When the reference indicator is 0, the first switch 410 may not perform synchronization. Alternatively, when the reference indicator is 0, the first switch 410 may be synchronized to the first reference time of the GM node 401.

The first switch 420 may identify the second reference time of the GM node 402, which is included in the synchronization message of the GM node 402 received from the second switch 420. The first switch 410 may compare the second reference time of the GM node 402 with the first local time of the first switch 410. The first switch 410 may calculate a difference between the second reference time of the GM node 402 and the first local time of the first switch 410, and record the difference therebetween (S513-1). Each time the first switch 410 receives the synchronization message from the GM node 402, the first switch 410 may calculate a cumulative mean value of the differences between the second reference time of the GM node 402 and the first local time of the first switch 410, and record the calculated cumulative mean value.

The difference value between the first local time of the first switch 410 and the second reference time of the GM node 402 may be a variance value of the first local time of the first switch 410 with respect to the second reference time of the GM node 402. When the reference indicator is 0, the first switch 410 may not perform synchronization. Alternatively, when the reference indicator is 0, the first switch 410 may be synchronized to the second reference time of the GM node 402.

The end node 411 may identify the first reference time of the GM node 401, which is included in the synchronization message of the GM node 401 received from the first switch 410. The end node 411 may compare the first reference time of the GM node 401 with a local time (hereinafter, referred to as 'fourth local time') of the end node 411. The end node 411 may calculate a difference between the first reference time of the GM node 401 and the fourth local time of the end node 411, and record the difference therebetween (S514-1). The difference between the first reference time and the fourth local time may be a propagation delay between the GM node 401 and the end node 411. Each time the end node 411 receives the synchronization message from the GM node 401, the end node 411 may calculate a cumulative mean value of the differences between the first reference time of the GM node 401 and the fourth local time of the end node 411, and record the calculated cumulative mean value.

The difference value between the fourth local time of the end node 411 and the first reference time of the GM node 401 may be a variance value of the fourth local time of the end node 411 with respect to the first reference time of the GM node 401. When the reference indicator is 0, the end node 411 may not perform synchronization. Alternatively, when the reference indicator is 0, the end node 411 may be synchronized to the first reference time of the GM node 401.

The end node 411 may identify the second reference time of the GM node 402, which is included in the synchronization message of the GM node 402 received from the first switch 410. The end node 411 may compare the second reference time of the GM node 402 with the fourth local time of the end node 411. The end node 411 may calculate a difference between the second reference time of the GM node 402 and the fourth local time of the end node 411, and record the difference therebetween (S514-1). Each time the end node 411 receives the synchronization message from the GM node 402, the end node 411 may calculate a cumulative mean value of the differences between the second reference time of the GM node 402 and the fourth local time of the end node 411, and record the calculated cumulative mean value.

The difference value between the fourth local time of the end node 411 and the second reference time of the GM node 402 may be a variance value of the fourth local time of the end node 411 with respect to the second reference time of the GM node 402. When the reference indicator is 0, the end node 411 may not perform synchronization. Alternatively, when the reference indicator is 0, the end node 411 may be synchronized to the second reference time of the GM node 402.

A seventh end node (not shown) may be directly connected to the GM node 401. The seventh end node may identify the first reference time of the GM node 401, which is included in the synchronization message of the GM node 401 received from the GM node 401. The seventh end node may compare the first reference time of the GM node 401 with a local time (hereinafter, referred to as 'fifth local time') of the seventh end node. The seventh end node may calculate and record a difference between the first reference time of the GM node 401 and the fifth local time of the seventh end node. Each time the seventh end node receives the synchronization message of the GM node 401, the seventh end node may calculate a cumulative mean value of the differences between the first reference time of the GM node 401 and the fifth local time of the seventh end node, and record the calculated cumulative mean value.

The time difference value between the fifth local time of the seventh end node and the first reference time of the GM node 401 may be a variance value of the fifth local time of the seventh end node with respect to the first reference time of the GM node 401. When the reference indicator is 0, the seventh end node may not perform synchronization. Alternatively, when the reference indicator is 0, the seventh end node may be synchronized to the first reference time of the GM node 401.

The seventh end node may identify the second reference time of the GM node 402, which is included in the synchronization message of the GM node 402 received from the GM node 401. The seventh end node may compare the second reference time of the GM node 402 with the fifth local time of the seventh end node. The seventh end node may calculate and record a difference between the second reference time of the GM node 402 and the fifth local time of the seventh end node. Each time the seventh end node receives the synchronization message of the GM node 402, the seventh end node may calculate a cumulative mean value of the differences between the second reference time of the GM node 402 and the fifth local time of the seventh end node 411, and record the calculated cumulative mean value.

The difference value between the fifth local time of the seventh end node and the second reference time of the GM node 402 may be a variance value of the fifth local time of the seventh end node with respect to the second reference time of the GM node 402. When the reference indicator is 0, the seventh end node may not perform synchronization. Alternatively, when the reference indicator is 0, the seventh end node may be synchronized to the second reference time of the GM node 402. Next, a synchronization performance evaluation method according to generation and transmission of synchronization performance evaluation messages based on the operations performed in FIG. 5A will be described.

FIG. 5B is a sequence chart illustrating a second exemplary embodiment of an operation method of a communication node in the vehicle network of FIG. 4.

As shown in FIGS. 4 and 5B, a vehicle network of FIG. 5B may be the same as or similar to the vehicle network of FIG. 4. A first GM node 401 of FIG. 5B may be the GM node 401 of FIG. 4, a second GM node 402 of FIG. 5B may be the GM node 402 of FIG. 4, a first switch 410 of FIG. 5B may be the first switch 410 of FIG. 4, a second switch 420 of FIG. 5B may be the second switch 420 of FIG. 4, a third switch 430 of FIG. 5B may be the third switch 430 of FIG. 4. An end node 411 of FIG. 5B may be the end node 411 of FIG. 4.

The communication nodes may support the IEEE 802.1AS-rev. The GM node 401 may belong to the first domain 440 and the GM node 402 may belong to the second domain 450, and the switches 410, 420 and 430 and the nodes 411, 412, 421, 422, 431 and 432 may belong to both the first domain 440 and the second domain 450. The switches 410, 420 and 430 and the end nodes 411, 412, 421, 422, 431 and 432 may operate as slave nodes. Each of the slave nodes 410, 411, 412, 420, 421, 422, 430, 431 and 432 may be synchronized to one of the GM node 401 and the GM node 402, which operates as a reference GM node. For example, the GM node 401 may be the reference GM node, and the slave nodes 410, 411, 412, 420, 421, 422, 430, 431 and 432 may be synchronized to a first reference time of the GM node 401. A seventh end node (not shown) may belong to both the first domain 440 and the second domain 450, and may operate as a slave node. Also, the seventh end node may also be synchronized to one the GM node 401 and the GM node 402).

The first end node 411 may generate a performance evaluation message including a difference value between the first reference time of the first GM node 401 and the fourth local time of the first end node 411 (S520). A structure of the performance evaluation message may be as follows.

Figure 7:
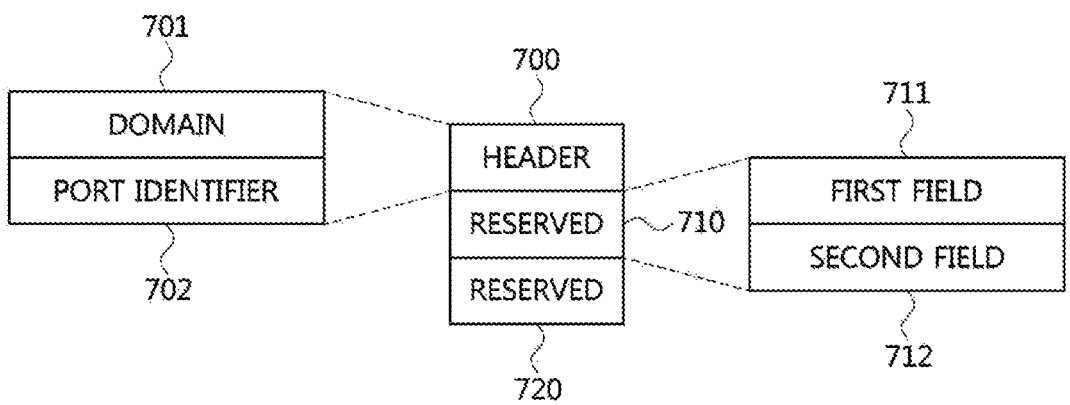
FIG. 7 is a block diagram illustrating a structure of a performance evaluation message.

FIG. 7 is a block diagram illustrating a structure of a performance evaluation message.

As shown in FIG. 7, a performance evaluation message may be a Pdelay_Req message defined in the IEEE802.1AS-rev. The performance evaluation message may include a header 700 and reserved fields 710 and 720. The header 700 may include a domain field 701 and a port identifier field 702. The performance evaluation message of FIG. 7 may be a performance evaluation message used in the vehicle network of FIG. 4. The domain field 701 may be recorded with an identifier indicating either the first domain 440 of FIG. 4 or the second domain 450 of FIG. 4. For example, when the performance evaluation message is a performance evaluation message that evaluates the synchronization performance for the first reference time of the first domain 440 (i.e., the GM node 401 of FIG. 4), the domain field 701 may be set to 0. On the other hand, when the performance evaluation message is a performance evaluation message that evaluates the synchronization performance for the second reference time of the second domain 450 (i.e., the GM node 402 of FIG. 4), the domain field 701 may be set to 1. The port identifier 702 may include an identifier of each port. The reserved fields of the performance evaluation message may include the first reserved field 711 indicating the number of communication nodes performing the performance evaluation (i.e., calculation of a difference between the reference time of the GM node and the local time of each communication node), and the second reserved field 712 indicating a sum of the differences between the reference time of the master node and the local times of the respective communication node. For example, in the first domain 440 of FIG. 4, when the first switch1 410 of FIG. 4 receives the performance evaluation message of the end node 411 of FIG. 4 and generates a performance evaluation message based on the received performance evaluation message, the first reserved field 711 of the performance evaluation message generated by the first switch 410 in FIG. 4 may indicate 2, and the second reserved field 712 may indicate a sum of a difference between the first reference time of the GM node 401 and the fourth local time of the end node 411 and a difference between the first reference time of the GM node 401 and the first local time of the first switch 410.

Referring again to FIG. 5B, the performance evaluation message of FIG. 5B may be the performance evaluation message of FIG. 7. The first reserved field 711 of the performance evaluation message generated by the end node 411 may indicate 1, and the second reserved field 712 may indicate a difference between the first reference time of the GM node 401 and the fourth local time of the end node 411. The end node 411 may transmit the generated performance evaluation message to the first switch 410 (S521).

The third switch 430 may generate a performance evaluation message including a difference value between the first reference time of the first GM node 401 and the third local time of the third switch 430 (S522). The first reserved field 711 of the performance evaluation message generated by the third switch 430 may indicate 1, and the second reserved field 712 may indicate a difference between the first reference time of the GM node 401 and the third local time of the switch 430. The switch 430 may transmit the generated performance evaluation message to the second switch 420 (S523).

The second switch 420 may receive the performance evaluation message from the third switch 430. The second switch 420 may identify the number of communication nodes indicated by the first reserved field 711 included in the performance evaluation message and the time difference value indicated by the second reserved field 712 included in the performance evaluation message. Based on the performance evaluation message received from the third switch 430, the second switch 420 may generate a performance evaluation message that further includes a difference value between the first reference time of the GM node 401 and the second local time of the second switch 420, which is calculated in the step S512-1 (S524).

The first reserved field 711 of the performance evaluation message of the second switch 420 may indicate a value (i.e., 2) obtained by adding 1 to the value (i.e., 1) indicated by the first reserved field 711 of the performance evaluation message received from the third switch 430. The second reserved field 712 of the performance evaluation message of the second switch 420 may indicate the value indicated by the second reserved field 712 of the performance evaluation message received from the third switch 430 (i.e., the difference value between the first reference time of the GM node 401 and the third local time of the third switch 430) and a difference value between the first reference time of the GM node 401 and the second local time of the second switch 420. Alternatively, the second reserved field 712 of the performance evaluation message of the second switch 420 may indicate a sum of the value indicated by the second reserved field 712 of the performance evaluation message received from the end node 420 and the difference value between the first reference time of the GM node 401 and the second local time of the second switch 420. The second switch 420 may transmit the generated performance evaluation message to the first switch 410 (S525).

The first switch 410 may receive the performance evaluation message from the end node 411, and receive the performance evaluation message from the second switch 420. The first switch 410 may identify the number of communication nodes indicated by the first reserved field 711 included in the performance evaluation message of the end node 411 and the time difference value indicated by the second reserved field 712 included in the performance evaluation message of the end node 411. Also, the first switch 410 may identify the number of communication nodes indicated by the first reserved field 711 included in the performance evaluation message of the second switch 420 and the time difference value indicated by the second reserved field 712 included in the performance evaluation message of the second switch 420. The first switch 410 may generate a performance evaluation message including the information included in the performance evaluation message of the end node 411, the information included in the performance evaluation message of the second switch 420, and the difference value between the first reference time of the GM node 401 and the first local time of the first switch 410 that is calculated in the step S513-1 of FIG. 5A (S526).

The first reserved field 711 of the performance evaluation message of the first switch 410 may indicate a value (i.e., 4) obtained by adding 1 to a sum (i.e., 3) of the value (i.e., 1) indicated by the first reserved field 711 of the performance evaluation message of the end node 411 and the value (i.e., 2) indicated by the first reserved field 711 of the performance evaluation message of the second switch 420. The second reserved field 712 of the performance evaluation message of the first switch 410 may indicate the value indicated by the second reserved field 712 of the performance evaluation message of the end node 411 (i.e., the difference value between the first reference time of the GM node 401 and the fourth local time of the end node 411), the values indicated by the second reserved field 712 of the performance evaluation message of the second switch 420 (i.e., the difference value between the first reference time of the GM node 401 and the second local time of the second switch 420 and the difference value between the first reference time of the GM node 401 and the third local time of the third switch 430), and the difference value between the first reference time of the GM node 401 and the first local time of the first switch 410. Alternatively, the second reserved field 712 of the performance evaluation message of the first switch 410 may indicate a sum of the value indicated by the second reserved field 712 of the performance evaluation message of the end node 411 (i.e., the difference value between the first reference time of the GM node 401 and the fourth local time of the end node 411), the values indicated by the second reserved field 712 of the performance evaluation message of the second switch 420 (i.e., the difference value between the first reference time of the GM node 401 and the second local time of the second switch 420 and the difference value between the first reference time of the GM node 401 and the third local time of the third switch 430), and the difference value between the first reference time of the GM node 401 and the first local time of the first switch 410. The first switch 410 may transmit the generated performance evaluation message to the GM node 401 (S527).

The end node 411 may generate a performance evaluation message including a difference value between the second reference time of the GM node 402 and the fourth local time of the end node 411 (S520). The first reserved field 711 of the performance evaluation message generated by the end node 411 may indicate 1 and the second reserved field 712 may indicate the difference value between the second reference time of the GM node 402 and the fourth local time of the end node 411. The end node 411 may transmit the generated performance evaluation message to the first switch 410 (S521).

The third switch 411 may generate a performance evaluation message including a difference value between the second reference time of the GM node 402 and the third local time of the third switch 411 (S522). The first reserved field 711 of the performance evaluation message generated by the third switch 430 may indicate 1, and the second reserved field 712 may indicate a difference value between the second reference time of the GM node 402 and the third local time of the third switch 411. The third switch 430 may transmit the generated performance evaluation message to the second switch 420 (S523).

The second switch 420 may receive the performance evaluation message from the third switch 430. The second switch 420 may identify the number of communication nodes indicated by the first reserved field 711 included in the performance evaluation message and the difference value indicated by the second reserved field 712 included in the performance evaluation message. Based on the performance evaluation message received from the third switch 430, the second switch 420 may generate a performance evaluation message that further includes a difference value between the second reference time of the GM node 402 and the second local time of the second switch 420, which is calculated in the step S512-1 (S524).

The first reserved field 711 of the performance evaluation message of the second switch 420 may indicate a value (i.e., 2) obtained by adding 1 to the value (i.e., 1) indicated by the first reserved field 711 of the performance evaluation message received from the third switch 430. The second reserved field 712 of the performance evaluation message of the second switch 420 may indicate the value indicated by the second reserved field 712 of the performance evaluation message received from the third switch 430 (i.e., the difference value between the second reference time of the GM node 402 and the third local time of the third switch 430) and a difference value between the second reference time of the GM node 402 and the second local time of the second switch 420. Alternatively, the second reserved field 712 of the performance evaluation message of the second switch 420 may indicate a sum of the value indicated by the second reserved field 712 of the performance evaluation message received from the third 430 and the difference value between the second reference time of the GM node 402 and the second local time of the second switch 420. The second switch 420 may transmit the generated performance evaluation message to the first switch 410 (S525).

The first switch 410 may receive the performance evaluation message from the end node 411, and receive the performance evaluation message from the second switch 420. The first switch 410 may identify the number of communication nodes indicated by the first reserved field 711 included in the performance evaluation message of the end node 411 and the time difference value indicated by the second reserved field 712 included in the performance evaluation message of the end node 411. The first switch 410 may identify the number of communication nodes indicated by the first reserved field 711 included in the performance evaluation message of the second switch 420 and the time difference value indicated by the second reserved field 712 included in the performance evaluation message of the second switch 420. The first switch 410 may generate a performance evaluation message including the information included in the performance evaluation message of the end node 411, the information included in the performance evaluation message of the second switch 420, and the difference value between the second reference time of the GM node 402 and the first local time of the first switch 410 that is calculated in the step S513-1 of FIG. 5A (S526).

The first reserved field 711 of the performance evaluation message of the first switch 410 may indicate a value (i.e., 4) obtained by adding 1 to a sum (i.e., 3) of the value (i.e., 1) indicated by the first reserved field 711 of the performance evaluation message of the end node 411 and the value (i.e., 2) indicated by the first reserved field 711 of the performance evaluation message of the second switch 420. The second reserved field 712 of the performance evaluation message of the first switch 410 may indicate the value indicated by the second reserved field 712 of the performance evaluation message of the end node 411 (i.e., the difference value between the second reference time of the GM node 402 and the fourth local time of the end node 411), the values indicated by the second reserved field 712 of the performance evaluation message of the second switch 420 (i.e., the difference value between the second reference time of the GM node 402 and the second local time of the second switch 420 and the difference value between the second reference time of the GM node 402 and the third local time of the third switch 430), and the difference value between the second reference time of the GM node 402 and the first local time of the first switch 410. Alternatively, the second reserved field 712 of the performance evaluation message of the first switch 410 may indicate a sum of the value indicated by the second reserved field 712 of the performance evaluation message of the end node 411 (i.e., the difference value between the second reference time of the GM node 402 and the fourth local time of the end node 411), the values indicated by the second reserved field 712 of the performance evaluation message of the second switch 420 (i.e., the difference value between the second reference time of the GM node 402 and the second local time of the second switch 420 and the difference value between the second reference time of the GM node 402 and the third local time of the third switch 430), and the difference value between the second reference time of the GM node 402 and the first local time of the first switch 410. The first switch 410 may transmit the generated performance evaluation message to the GM node 401 (S527).

The seventh end node (not shown) may be directly connected to the GM node 401. The seventh end node may generate a performance evaluation message including a difference value between the first reference time of the GM node 401 and the fifth local time of the seventh end node. The first reserved field 711 of the performance evaluation message generated by the seventh end node may indicate 1, and the second reserved field 712 may indicate the difference value between the first reference time of the GM node 401 and the fifth local time of the seventh end node. The seventh end node may transmit the generated performance evaluation message to the GM node 401.

The seventh end node may generate a performance evaluation message including a difference value between the second reference time of the GM node 402 and the fifth local time of the seventh end node. The first reserved field 711 of the performance evaluation message generated by the seventh end node may indicate 1, and the second reserved field 712 may indicate the difference value between the second reference time of the GM node 402 and the fifth local time of the seventh end node. The seventh end node may transmit the generated performance evaluation message to the GM node 401.

The GM node 401 may receive the performance evaluation messages from the first switch 410. The performance evaluation messages received by the GM node 401 from the first switch 410 may be a message for evaluating the synchronization performance of the GM node 401 and a message for evaluating the synchronization performance of the GM node 402. In the performance evaluation message evaluating the synchronization performance of the GM node 401, the domain field 701 may indicate the domain identifier (i.e., 0) of the GM node 401. In the performance evaluation message evaluating the synchronization performance of the GM node 402, the domain field 701 may indicate the domain identifier (i.e., 1) of the GM node 402.

The GM node 401 may analyze the time synchronization performance for each domain based on the corresponding performance evaluation message (S528). For example, when the second reserved field 712 of the performance evaluation message indicates the difference values between the reference time of the GM node and the local times of the respective communication nodes, the GM node 401 may add all the values indicated by the second reserved field 712 and divide it by the value indicated by the first reserved field 711. The value obtained by dividing the sum of all the values indicated by the second reserved field 712 by the value indicated by the first reserved field 711 may be an average of the difference values between the reference time of the GM node and the local times of the respective communication nodes.

Alternatively, when the second reserved field 712 of the performance evaluation message indicates the sum of the difference values between the first reference time of the GM node 401 and the local times of the respective communication nodes, the GM node 401 may divide the value indicated by the second reserved field 712 of the performance evaluation message by the value indicated by the first reserved field 711. The value obtained by dividing the value indicated by the second reserved field 712 by the value indicated by the first reserved field 711 may be the average of the difference values between the reference time of the GM node and the local times of the respective communication nodes.

The GM node 401 may compare the averages of the time difference values, and identify the domain field 701 of the performance evaluation message having the smaller average of the time differences. The GM node 401 may determine that the domain having the smaller average of the differences between the local times of the respective communication nodes for each domain and the reference time of the GM node is a domain in which synchronization is better performed. The GM node 401 may select the domain in which synchronization is better performed as a reference domain (S529).

For example, when the domain field 701 of the performance evaluation message having the smaller average of the time differences indicates 0, this may correspond to the first domain 440 of FIG. 4, and the GM node 401 may select the GM node 401 as the reference GM node. On the other hand, when the domain field 701 of the performance evaluation message having the smaller average of the time differences indicates 1, this may correspond to the second domain 450 of FIG. 4, and the GM node 401 may select the GM node 402 as the reference GM node.

The GM node 401 may select the domain having the small average of time differences as a reference domain, and generate a synchronization message including reference domain information (i.e., information on the selected reference domain). A reserved field of the synchronization message of the GM node 401 may indicate the identifier of the reference domain selected in the previous step. For example, when the GM node 402 is selected as the reference GM node, the reserved field of the synchronization message of the GM node 401 may indicate 1.

In FIG. 5B, the steps for receiving performance evaluation messages from the communication nodes 410, 411, 420 and 430, and the steps 528 and 529 have been described in terms of the GM node 401. However, the same steps may be performed in the GM node 402 as well. Next, an exemplary embodiment after the GM nodes 401 and 402 perform the steps of FIG. 5B will be described.

The GM node 401 may transmit a synchronization message including the first reference time of the GM node 401 and the reference domain information to the first switch 410. For example, a reserved field in the synchronization message may indicate a reference domain which is a synchronization reference. That is, the reference domain information may indicate which GM node operates as a reference GM node. For example, when the GM node 401 is the reference GM node, the reserved field of the synchronization message may indicate 0. When the GM node 402 is the reference GM node, the reserved field of the synchronization message may indicate 1. Alternatively, the reserved field of the synchronization message may include the identifier of the reference GM node. When the GM node 401 is the reference GM node, the reserved field of the synchronization message may indicate the identifier of the GM node 401, and when the GM node 402 is the reference GM node, the reserved field of the synchronization message may indicate the identifier of the GM node 402.

The GM node 401 may transmit to the first switch 410 the synchronization message basically including the first reference time of the grand master node 401. The header of the synchronization message may include the reference indicator. For example, when the reference indicator is 1, the synchronization message may include the reference domain information and the reference time, and when the reference indicator is 0, the synchronization message may include only the reference time.

Since the reference domain is selected in the step S529 of FIG. 5B, the reference indicator of the synchronization message transmitted from the GM node 401 to the first switch 410 may be set to 1. When the communication nodes 410, 411, 420, and 430 receive the synchronization message, the communication nodes 410, 411, 420, and 430 may identify the format of the synchronization message based on the reference indicator included in the header of the synchronization message. When the reference indicator of the synchronization message is 1, the communication nodes 410, 411, 420, and 430 may determine that the synchronization message includes both of the reference domain information and the reference time.

The synchronization messages of the GM node 401 and the GM node 402 may be transmitted to the communication nodes 410, 411, 420, and 430 as in the steps S501 to S505 and the steps S511 to S515 of FIG. 5A. Here, the synchronization message may be a Sync message defined in the IEEE802.1AS-Rev.

The first switch 410 may identify the reference indicator included in the synchronization message of the GM node 401 received from the GM node 401. The first switch 410 may determine the format of the synchronization message based on the reference indicator (i.e., 1) included in the synchronization message. When the reference indicator is 1, the first switch 410 may determine that the synchronization message includes the reference domain information and the reference time. In this case, the first switch 410 may identify the first reference time of the GM node 401 and identify the reference domain information. When the reserved field of the synchronization message indicates 1, the first switch 410 may determine that the GM node 402 operates as the reference GM node. Therefore, the first switch 410 may not be synchronized to the first reference time of the GM node 401.

The first switch 410 may identify the reference indicator included in the synchronization message of the GM node 402 received from the second switch 420. The first switch 410 may determine the format of the synchronization message based on the reference indicator (i.e., 1) included in the synchronization message. When the reference indicator is 1, the first switch 410 may determine that the synchronization message includes the reference domain information and the reference time. In this case, the first switch 410 may identify the second reference time of the GM node 402 and identify the reference domain information. When the reserved field of the synchronization message indicates 1, the second switch 420 may determine that the GM node 402 operates as the reference GM node. Therefore, the first switch 410 may be synchronized to the second reference time of the GM node 402.

The second switch 420 may identify the reference indicator included in the synchronization message of the GM node 401 received from the first switch 410. The second switch 420 may determine the format of the synchronization message based on the reference indicator (i.e., 1) included in the synchronization message. When the reference indicator is 1, the second switch 420 may determine that the synchronization message includes the reference domain information and the reference time. In this case, the second switch 420 may identify the first reference time of the GM node 401 and identify the reference domain information. When the reserved field of the synchronization message indicates 1, the second switch 420 may determine that the GM node 402 operates as the reference GM node. Therefore, the second switch 420 may not be synchronized to the first reference time of the GM node 401.

The second switch 420 may identify the reference indicator included in the synchronization message of the GM node 402 received from the third switch 430. The second switch 420 may determine the format of the synchronization message based on the reference indicator (i.e., 1) included in the synchronization message. When the reference indicator is 1, the second switch 420 may determine that the synchronization message includes the reference domain information and the reference time. In this case, the second switch 420 may identify the second reference time of the GM node 402 and identify the reference domain information. When the reserved field of the synchronization message indicates 1, the second switch 420 may determine that the GM node 402 operates as the reference GM node. Therefore, the second switch 420 may be synchronized to the second reference time of the GM node 402.

The third switch 420 may identify the reference indicator included in the synchronization message of the GM node 401 received from the second switch 420. The third switch 430 may determine the format of the synchronization message based on the reference indicator (i.e., 1) included in the synchronization message. When the reference indicator is 1, the third switch 430 may determine that the synchronization message includes the reference domain information and the reference time. In this case, the third switch 430 may identify the first reference time of the GM node 401 and identify the reference domain information. When the reserved field of the synchronization message indicates 1, the third switch 430 may determine that the GM node 402 operates as the reference GM node. Therefore, the third switch 420 may not be synchronized to the first reference time of the GM node 401.

The third switch 420 may identify the reference indicator included in the synchronization message of the GM node 402 received from the GM node 402. The third switch 430 may determine the format of the synchronization message based on the reference indicator (i.e., 1) included in the synchronization message. When the reference indicator is 1, the third switch 430 may determine that the synchronization message includes the reference domain information and the reference time. In this case, the third switch 430 may identify the second reference time of the GM node 402 and identify the reference domain information. When the reserved field of the synchronization message indicates 1, the third switch 430 may determine that the GM node 402 operates as the reference GM node. Therefore, the third switch 420 may be synchronized to the second reference time of the GM node 402.

The end node 411 may identify the reference indicator included in the synchronization message of the GM node 401 received from the first switch 410. The end node 411 may determine the format of the synchronization message based on the reference indicator (i.e., 1) included in the synchronization message. When the reference indicator is 1, the end node 411 may determine that the synchronization message includes the reference domain information and the reference time. In this case, the end node 411 may identify the first reference time of the GM node 401 and identify the reference domain information. When the reserved field of the synchronization message indicates 1, the end node 411 may determine that the GM node 402 operates as the reference GM node. Therefore, the end node 411 may not be synchronized to the first reference time of the GM node 401.

The end node 411 may identify the reference indicator included in the synchronization message of the GM node 402 received from the first switch 410. The end node 411 may determine the format of the synchronization message based on the reference indicator (i.e., 1) included in the synchronization message. When the reference indicator is 1, the end node 411 may determine that the synchronization message includes the reference domain information and the reference time. In this case, the end node 411 may identify the second reference time of the GM node 402 and identify the reference domain information. When the reserved field of the synchronization message indicates 1, the end node 411 may determine that the GM node 402 operates as the reference GM node. Therefore, the end node 411 may be synchronized to the second reference time of the GM node 402.

The methods according to exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the exemplary embodiments of the present disclosure and their advantages have been described in detail above, it should be understood that various changes, substitutions and alterations may be made herein without departing from the scope of the disclosure.

What is claimed is:

1. An operation method of a first communication node operating as a current reference grand master (GM) node in a vehicle network, the operation method comprising:
    transmitting a first synchronization message including a first reference time of the first communication node;
    receiving a first response message from a second communication node, the first response message including a first synchronization offset indicating a difference between a first local time of the second communication node and the first reference time;
    receiving a second response message from the second communication node, the second response message including a second synchronization offset indicating a difference between the first local time and a second reference time of a third communication node operating as a GM node;
    comparing the first synchronization offset and the second synchronization offset;
    determining the first communication node or the third communication node as a first new reference GM node based on a result of comparison between the first synchronization offset and the second synchronization offset; and
    transmitting a second synchronization message including information on the first reference time of the first communication node and information on the first new reference GM node,
    wherein the second synchronization message includes an indicator indicating a format of the second synchronization message, and
    wherein the indicator indicates that the second synchronization message includes the information on the first new reference GM node.

2. The operation method according to claim 1, wherein the first communication node and the third communication node have different time domains.

3. The operation method according to claim 1, wherein the first synchronization message further includes an indicator indicating a format of the first synchronization message, and the indicator indicates that the information on the first new reference GM node is not included in the first synchronization message.

4. The operation method according to claim 1, wherein, when the second communication node is a switch, a fourth communication node is an end node connected to the first communication node through the second communication node, the first response message further includes a third synchronization offset indicating a difference between the first reference time and a second local time of the fourth communication node, and a second new reference GM node is determined based on a result of comparison among the first synchronization offset, the second synchronization offset, and the third synchronization offset.

5. The operation method according to claim 4, wherein the second response message further includes a fourth synchronization offset indicating a difference between the second reference time and the second local time of the fourth communication node, and
    wherein a third new reference GM node is determined based on a result of comparison among the first synchronization offset, the second synchronization offset, the third synchronization offset, and the fourth synchronization offset.

6. The operation method according to claim 1, wherein the second synchronization message is a Sync message, and a reserved field of the Sync message indicates an identifier of the first new reference GM node.

7. An operation method of a switch in a vehicle network, the operation method comprising:
    receiving a first synchronization message from a first grand master (GM) node, the first synchronization message including a first reference time of the first GM node;

calculating a first synchronization offset indicating a difference between the first reference time and a first local time of the switch;

receiving a first response message from an end node, the first response message including a second synchronization offset indicating a difference between a second local time of the end node and the first reference time;

transmitting a second response message to the first GM node, the second response message including the first synchronization offset and the second synchronization offset;

receiving a second synchronization message from the first GM node, the second synchronization message including information on a first reference GM node determined based on the first response message and the second response message; and synchronizing the switch based on the second synchronization message.

8. The operation method according to claim 7, wherein, when the first reference GM node is the first GM node, the switch is synchronized to the first reference time of the first GM node.

9. The operation method according to claim 7, further comprising, before the synchronizing, receiving a third synchronization message from a second GM node, the third synchronization message including a second reference time of the second GM node;

calculating a third synchronization offset indicating a difference between the second reference time and the first local time of the switch;

receiving a third response message from the end node, the third response message including a fourth synchronization offset indicating a difference between the second local time of the end node and the second reference time;

transmitting a fourth response message to the second GM node, the fourth response message including the third synchronization offset and the fourth synchronization offset; and receiving a fourth synchronization message from the first GM node, the fourth synchronization message including information on a second reference GM node determined based on based on the third response message and the fourth response message, wherein, in the synchronizing, the switch is synchronized to the second reference time of the second GM node when the second reference GM node is the second GM node.

10. The operation method according to claim 7, wherein the first GM node and the second GM node have different time domains.

11. The operation method according to claim 7, wherein the first synchronization message further includes an indicator indicating a format of the first synchronization message, and the indicator indicates that the information on the first reference GM node is not included in the first synchronization message.

12. The operation method according to claim 7, wherein the second synchronization message further includes an indicator indicating a format of the second synchronization message, and the indicator indicates that the information on the first reference GM node is included in the second synchronization message.

13. The operation method according to claim 7, wherein the second synchronization message is a Sync message, and a reserved field of the Sync message indicates an identifier of the first reference GM node.

14. An operation method of an end node in a vehicle network, the operation method comprising:

receiving a first synchronization message including a first reference time of a first grand master (GM) node;

calculating a first synchronization offset indicating a difference between a first local time of the end node and the first reference time;

transmitting a first response message including the first synchronization offset;

receiving a second synchronization message of the first GM node from the switch, the second synchronization message including information on a first reference GM node determined based on the first response message; and synchronizing the switch based on the second synchronization message.

15. The operation method according to claim 14, wherein, when the first reference GM node is the first GM node, the end node is synchronized to the first reference time of the first GM node.

16. The operation method according to claim 14, further comprising, before the synchronizing, receiving a third synchronization message including a second reference time of a second GM node;

calculating a fourth synchronization offset indicating a difference between the second reference time and the first local time of the end node;

transmitting a second response message including the fourth synchronization offset; and receiving a fourth synchronization message of the second GM node from the switch, the fourth synchronization message including information on a second reference GM node determined based on the second response message, wherein, in the synchronizing, the end node is synchronized to the second reference time of the second GM node when the second reference GM node is the second GM node.

17. The operation method according to claim 14, wherein the first GM node and the second GM node have different time domains.

18. The operation method according to claim 14, wherein the first synchronization message further includes an indicator indicating a format of the first synchronization message, and the indicator indicates that the information on the first reference GM node is not included in the first synchronization message.

19. The operation method according to claim 14, wherein the second synchronization message further includes an indicator indicating a format of the second synchronization message, and the indicator indicates that the information on the first reference GM node is included in the second synchronization message.

20. The operation method according to claim 14, wherein the second synchronization message is a Sync message, and a reserved field of the Sync message indicates an identifier of the first reference GM node.

* * * * *